United States Patent
Clark et al.

(10) Patent No.: US 9,387,428 B2
(45) Date of Patent: Jul. 12, 2016

(54) SYSTEMS AND METHODS FOR TREATING FLAMMABLE EFFLUENT GASES FROM MANUFACTURING PROCESSES

(75) Inventors: Daniel O. Clark, Pleasanton, CA (US); Mehran Moalem, Cupertino, CA (US); Robbert M. Vermeulen, Pleasant Hill, CA (US); Phil Chandler, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 785 days.

(21) Appl. No.: 12/365,886

(22) Filed: Feb. 4, 2009

(65) Prior Publication Data

US 2009/0216061 A1 Aug. 27, 2009

Related U.S. Application Data

(60) Provisional application No. 61/120,844, filed on Dec. 8, 2008, provisional application No. 61/026,131, filed on Feb. 5, 2008, provisional application No. 61/026,432, filed on Feb. 5, 2008.

(51) Int. Cl.
*B01D 53/00* (2006.01)
*B01D 53/40* (2006.01)

(52) U.S. Cl.
CPC .............. *B01D 53/005* (2013.01); *B01D 53/40* (2013.01); *B01D 2257/108* (2013.01); *B01D 2258/0216* (2013.01)

(58) Field of Classification Search
CPC ...... B01D 53/005; B01D 53/40; B01D 53/44; B01D 2258/0216

USPC ......... 422/115, 117, 119, 168, 169, 170, 171, 422/173, 2; 48/192; 423/210, 240 R
See application file for complete search history.

(56) References Cited

U.S. PATENT DOCUMENTS 4,455,614 A  6/1984 Martz et al.
4,973,451 A * 11/1990 Vickery ..................... 48/192

(Continued)

FOREIGN PATENT DOCUMENTS

JP   1998-312968   11/1998
KR   1020060132872  12/2006

(Continued)

OTHER PUBLICATIONS

Nov. 3, 2011 Response to Office Action of U.S. Appl. No. 12/365,894 mailed Jul. 14, 2011.

(Continued)

*Primary Examiner* — Jill Warden
*Assistant Examiner* — Joye L Woodard
(74) *Attorney, Agent, or Firm* — Dugan & Dugan, PC

(57) ABSTRACT

A system for treating flammable effluent gas is provided. The system includes an exhaust conduit to carry the flammable effluent gas to an abatement unit, a control system coupled to the abatement unit to determine an operating parameter of the abatement unit, a bypass valve coupled to the exhaust conduit which is an operative responsive to the monitoring system, and a source of second gas to be mixed with the effluent gas diverted from the abatement unit when the bypass valve is operating in a bypass mode to provide a mixed gas having a flammability lower than the effluent gas. Methods of the invention as well as numerous other aspects are provided.

16 Claims, 3 Drawing Sheets

(56) References Cited

U.S. PATENT DOCUMENTS

| | | | |
|---|---|---|---|
| 5,220,517 A | 6/1993 | Sierk et al. | |
| 5,676,712 A * | 10/1997 | Anderson | 48/192 |
| 5,800,792 A * | 9/1998 | Ibaraki et al. | 423/210 |
| 6,068,016 A | 5/2000 | Manofsky, Jr. et al. | |
| 6,234,787 B1 * | 5/2001 | Endoh et al. | 431/353 |
| 6,303,395 B1 | 10/2001 | Nulman | |
| 6,312,525 B1 | 11/2001 | Bright et al. | |
| 6,321,587 B1 | 11/2001 | Laush | |
| 6,408,220 B1 | 6/2002 | Nulman | |
| 6,456,894 B1 | 9/2002 | Nulman | |
| 6,532,715 B2 | 3/2003 | Reinke et al. | |
| 6,556,949 B1 | 4/2003 | Lyon | |
| 6,583,509 B2 | 6/2003 | Nulman | |
| 6,800,255 B2 | 10/2004 | Brady et al. | |
| 6,949,225 B1 | 9/2005 | Mori et al. | |
| 6,966,967 B2 | 11/2005 | Curry et al. | |
| 7,032,614 B2 | 4/2006 | Lappen et al. | |
| 7,050,873 B1 | 5/2006 | Discenzo | |
| 7,063,301 B2 | 6/2006 | Schauer | |
| 7,105,037 B2 | 9/2006 | Olander et al. | |
| 7,138,096 B2 | 11/2006 | Moore et al. | |
| 7,159,599 B2 | 1/2007 | Verhaverbeke et al. | |
| 7,188,142 B2 | 3/2007 | Chi et al. | |
| 7,218,983 B2 | 5/2007 | Puri et al. | |
| 7,225,047 B2 | 5/2007 | Al-Bayati et al. | |
| 7,272,456 B2 | 9/2007 | Farchmin et al. | |
| 7,305,275 B2 | 12/2007 | Miyazaki et al. | |
| 7,477,960 B2 | 1/2009 | Willis et al. | |
| 7,485,169 B2 | 2/2009 | Olander et al. | |
| 7,486,391 B2 | 2/2009 | Chen et al. | |
| 7,603,195 B2 | 10/2009 | Puri et al. | |
| 7,682,574 B2 * | 3/2010 | Chiu et al. | 422/108 |
| 7,720,557 B2 | 5/2010 | Teferra et al. | |
| 7,751,046 B2 | 7/2010 | Levy et al. | |
| 7,760,325 B2 | 7/2010 | Okada | |
| 7,857,880 B2 | 12/2010 | Olander et al. | |
| 7,871,249 B2 | 1/2011 | Urquhart et al. | |
| 2002/0023329 A1 | 2/2002 | Nulman | |
| 2003/0045098 A1 | 3/2003 | Verhaverbeke et al. | |
| 2003/0175176 A1 * | 9/2003 | Ikeda et al. | 422/178 |
| 2003/0221960 A1 | 12/2003 | Nakao et al. | |
| 2005/0039425 A1 | 2/2005 | Olander et al. | |
| 2005/0135984 A1 | 6/2005 | Ferron et al. | |
| 2005/0180897 A1 * | 8/2005 | Kokun et al. | 422/168 |
| 2005/0235232 A1 | 10/2005 | Papanikolaou et al. | |
| 2006/0065120 A1 | 3/2006 | Clements et al. | |
| 2006/0104878 A1 | 5/2006 | Chiu et al. | |
| 2006/0104879 A1 | 5/2006 | Chiu et al. | |
| 2006/0130649 A1 | 6/2006 | Jain et al. | |
| 2006/0172427 A1 | 8/2006 | Germouni et al. | |
| 2006/0196541 A1 | 9/2006 | Gerken et al. | |
| 2006/0211129 A1 | 9/2006 | Stevens et al. | |
| 2007/0062167 A1 | 3/2007 | Olander et al. | |
| 2007/0070803 A1 | 3/2007 | Urquhart | |
| 2007/0108113 A1 | 5/2007 | Urquhart et al. | |
| 2007/0109912 A1 | 5/2007 | Urquhart et al. | |
| 2007/0119816 A1 | 5/2007 | Urquhart et al. | |
| 2007/0183909 A1 | 8/2007 | Kusay et al. | |
| 2007/0276532 A1 | 11/2007 | Teferra et al. | |
| 2008/0191153 A1 | 8/2008 | Marganski et al. | |
| 2009/0141583 A1 | 6/2009 | Fanjat et al. | |
| 2009/0188603 A1 | 7/2009 | Haller et al. | |
| 2009/0204234 A1 | 8/2009 | Sustaeta et al. | |
| 2009/0204237 A1 | 8/2009 | Sustaeta et al. | |
| 2009/0204245 A1 | 8/2009 | Sustaeta et al. | |
| 2009/0204267 A1 | 8/2009 | Sustaeta et al. | |
| 2009/0210081 A1 | 8/2009 | Sustaeta et al. | |
| 2009/0272272 A1 | 11/2009 | Olander et al. | |
| 2009/0326703 A1 | 12/2009 | Presley et al. | |
| 2011/0008964 A1 | 1/2011 | Hughes et al. | |
| 2011/0135552 A1 | 6/2011 | Dickinson et al. | |

FOREIGN PATENT DOCUMENTS

| | | |
|---|---|---|
| WO | WO 0035573 | 6/2000 |
| WO | WO 2007-048993 | 5/2007 |
| WO | WO 2007-091100 | 8/2007 |

OTHER PUBLICATIONS

International Search Report and Written Opinion of International Application No. PCT/US2009/033125 dated Apr. 15, 2009.

Clark, et al., U.S. Appl. No. 12/365,894, filed Feb. 4, 2009.

Office Action of U.S. Appl. No. 12/365,894 mailed Jul. 14, 2011.

Imagine That, Inc., "Extend: Semiconductor Company Uses Simulation Software to Improve FAB Operations-Extend Software Used to Optimize FABs", Jul. 2002, obtained online at www.imaginethatinc.com on Jun. 27, 2011.

Holland, P.; Percy, M.; and Boegner, J., "Designing Safe, Low-Cost Vacuum and Exhaust Management Systems for Semiconductor Processes", Oct. 2007, Semiconductor Manufacturing China.

Schrecengost, R. and Naughton, P., "Cleanroom Energy Optimization Methods", May 2004, Richardson, TX, Proceedings of the 14th Symposium on Improving Building Systems in Hot and Humid Climates.

International Preliminary Report on Patentability and Written Opinion of International Application No. PCT/US2009/033125 dated Aug. 19, 2010.

International Preliminary Report on Patentability and Written Opinion of International Application No. PCT/US2009/033124 dated Aug. 19, 2010.

International Search Report and Written Opinion of International Application No. PCT/US2009/033124 dated Sep. 15, 2009.

Amendment Submitted with RCE of U.S. Appl. No. 12/365,894, filed Apr. 20, 2012.

Final Office Action of U.S. Appl. No. 12/365,894 mailed Mar. 1, 2012.

Office Action of U.S. Appl. No. 12/365,894, mailed Oct. 5, 2012.

Grothaus, M.G. and Fanick, E.R., "Harmful Compounds Yield to Non-therma Plasma Reactor", Spring 1996, Technology Today, Southwest Research Institute.

Grothaus, M.G. and Khair, M., "A Crossed-Flow Pulsed Corona Reactor", 2001, Digest of Technical Papers, Pulsed Power Plasma Science, vol. 2, pp. 1098-1101.

Li, S.-N.; Shis, H.-Y.; Wang, K.-S.; Hsieh, K.; Chen, Yin-Yung, Chen, Y.-Y.; and Chan, J., "Preventive Maintence Measures for Contamination Control", Dec. 2004, Solid State Technology, vol. 48, Iss. 12.

Naughton, P. and Olander, K., "Exhaust/Energy Reduction Opportunities", Oct. 2003, Controlled Environments Magazine.

Tonnis, E.J.; Vartanian, V.; Bev, L.; Lii, T.; Jewett, R. and Graves, D., "Evaluation of a Litmas 'Blue' Point-of-use (POU) Plasma Abatement Device for Perfluorocompound (PFC) Destruction", Dec. 1998, International Sematech, Technology Transfer No. 98123605A-ENG.

Search Report of Chinese Patent Application No. 200980104223.X, dated Dec. 20, 2012.

Jan. 2, 2013 Response to Office Action of U.S. Appl. No. 12/365,894 mailed Oct. 2, 2012.

Jul. 31, 2013 Reply to May 8, 2013 Final Office Action of U.S. Appl. No. 12/365,894.

Advisory Action of U.S. Appl. No. 12/365,894 mailed Aug. 15, 2013.

Final Office Action of U.S. Appl. No. 12/365,894 mailed May 8, 2013.

Notice of Abandonment of U.S. Appl. No. 12/365,894 mailed Jan. 16, 2014.

Search Report of Taiwan Patent Application No. 98103721 dated Mar. 24, 2014.

Search Report of Taiwan Patent Application No. 98103722 dated Dec. 17, 2014.

* cited by examiner

SYSTEMS AND METHODS FOR TREATING FLAMMABLE EFFLUENT GASES FROM MANUFACTURING PROCESSES

The present application claims priority to U.S. Provisional Patent Application Ser. No. 61/120,844 filed Dec. 8, 2008 and entitled "Systems And Methods For Treating Flammable Effluent Gases From Manufacturing Processes", to U.S. Provisional Patent Application Ser. No. 61/026,131 filed Feb. 5, 2008 and entitled "Abatement Systems" and to U.S. Provisional Patent Application Ser. No. 61/026,432 filed Feb. 5, 2008 and entitled "Abatement Systems" all of which are hereby incorporated herein by reference in their entirety for all purposes.

CROSS-REFERENCE TO RELATED APPLICATIONS/PATENTS

The present application is related to the following commonly-assigned, co-pending U.S. Patent Applications and Patents, which are hereby incorporated herein by reference in their entirety for all purposes:

U.S. Patent Application publication number 2006/0104879, filed Nov. 12, 2004, entitled "Reactor Design To Reduce Particulate Deposition During Process Abatement,"

U.S. Patent Application publication number 2006/0104878, filed Nov. 18, 2004, entitled "Safety, Monitoring And Control Features For Thermal Abatement Reactor," and U.S. Pat. No. 7,138,096, entitled "Method For Decomposition Of Gaseous Pollutants."

FIELD OF THE INVENTION

The present invention relates to the treatment of gas streams containing pollutants, and more specifically to methods and apparatus for treatment of flammable effluent gases resulting from manufacturing processes.

BACKGROUND OF THE INVENTION

In the manufacture of semiconductor materials, and electronic devices, products, and memory articles, a wide variety of chemical compounds are employed. In such processes, effluent gases may be produced, some of which may be flammable. For example, flammable or pyrophoric gases such as hydrogen gas and/or silane gas may be produced as effluent gases. As such, it may be generally desirable to treat these effluent gases, such as by passing them through an appropriate abatement unit.

Conventional effluent abatement systems typically include thermal reactors which may remove waste effluent components at decomposition removal efficiencies of greater than 95%, for example. In the case of flammable or pyrophoric effluent gases, such as hydrogen gas and silane gas, the effluent gases themselves may be used as the fuel for the abatement unit. When combined with an oxidant, the flammable or pyrophoric effluent gases may be appropriately ignited and combusted.

As thermal abatement systems have developed, so has the desirability for developing safety systems to enable safe operation of such abatement systems and to reduce or eliminate possible explosion risks. This is especially true for systems where the process effluent gas is highly flammable or pyrophoric.

Accordingly, methods and apparatus for increasing the safety for such effluent treatment systems are desired.

SUMMARY OF THE INVENTION

In one aspect a method of treating a flammable effluent gas from an electronic device manufacturing process is provided. The method includes the steps of providing the flammable effluent gas from the manufacturing process to an abatement unit which is adapted to abate the flammable effluent gas; monitoring a parameter of the abatement unit; diverting the flammable effluent gas to bypass the abatement unit if the parameter of the abatement unit falls outside a predefined bound; and mixing the diverted flammable effluent gas with a second gas to form a gas mixture having a lower flammability than the flammable effluent gas In another aspect, a method for treating a flammable effluent gas is provided including the steps of providing the flammable effluent gas from an electronic device manufacturing process tool to an abatement unit which is adapted to abate the flammable effluent gas; diverting the flammable effluent gas from the abatement unit at certain times; and mixing the diverted flammable effluent gas with a second gas to form a gas mixture having a flammability lower than the flammable effluent gas.

In another aspect, a method of treating a flammable effluent gas from an electronic device manufacturing process is provided. The method includes the steps of flowing the flammable effluent gas from a process chamber of the electronic device manufacturing process to an abatement unit wherein the flammable effluent gas is comprised of silane and hydrogen; monitoring a parameter of the abatement unit; diverting the flammable effluent gas to bypass the abatement unit if the parameter of the abatement unit falls outside a predefined bound; and mixing the diverted flammable effluent gas with a nitrogen gas to form a gas mixture having a lower flammability than the flammable effluent gas.

In another aspect, a system for treating a flammable effluent gas of an electronic device manufacturing process chamber is provided including an exhaust conduit adapted to carry the flammable effluent gas to an abatement unit; a monitoring system coupled to the abatement unit and adapted to sense a parameter of the abatement unit; a bypass valve coupled to the exhaust conduit and operatively responsive to the monitoring system, wherein the bypass valve has a bypass mode and a flow through mode, and wherein a flow of the flammable effluent gas is diverted from the abatement unit in the bypass mode, and a flow of the flammable effluent gas is directed to the abatement unit in the flow through mode; and a second gas source adapted to mix the second gas with the flammable effluent gas when the bypass valve is operating in the bypass mode.

In another aspect, a method of treating a flammable effluent gas is provided, including the steps of flowing the flammable effluent gas from an electronic device manufacturing process tool through a pump and exhaust conduit to an abatement unit and, during the step of flowing, purging the pump with a volumetric flow rate of purge gas of a first magnitude; shutting down the flow of the flammable effluent gas from the manufacturing process tool; and reducing the volumetric flow rate of the purge gas to a second, nonzero flow rate for a period of time to at least partially purge the pump and the exhaust conduit between the pump and the abatement unit.

In yet another aspect, a method of treating a flammable effluent gas is provided, including the steps of flowing flammable effluent gas from an electronic device manufacturing process tool to an abatement unit through exhaust components; shutting down the flow of the flammable effluent gas from the manufacturing process tool; and delaying a shutdown of the abatement unit for a period of time to purge the flammable effluent gas from at least some of the exhaust components located between the manufacturing process tool and the abatement unit.

Numerous other aspects are provided in accordance with these and other aspects of the invention. Other features and aspects of the present invention will become more fully apparent from the following detailed description, the appended claims and the accompanying drawings.

DETAILED DESCRIPTION

Figure 1:
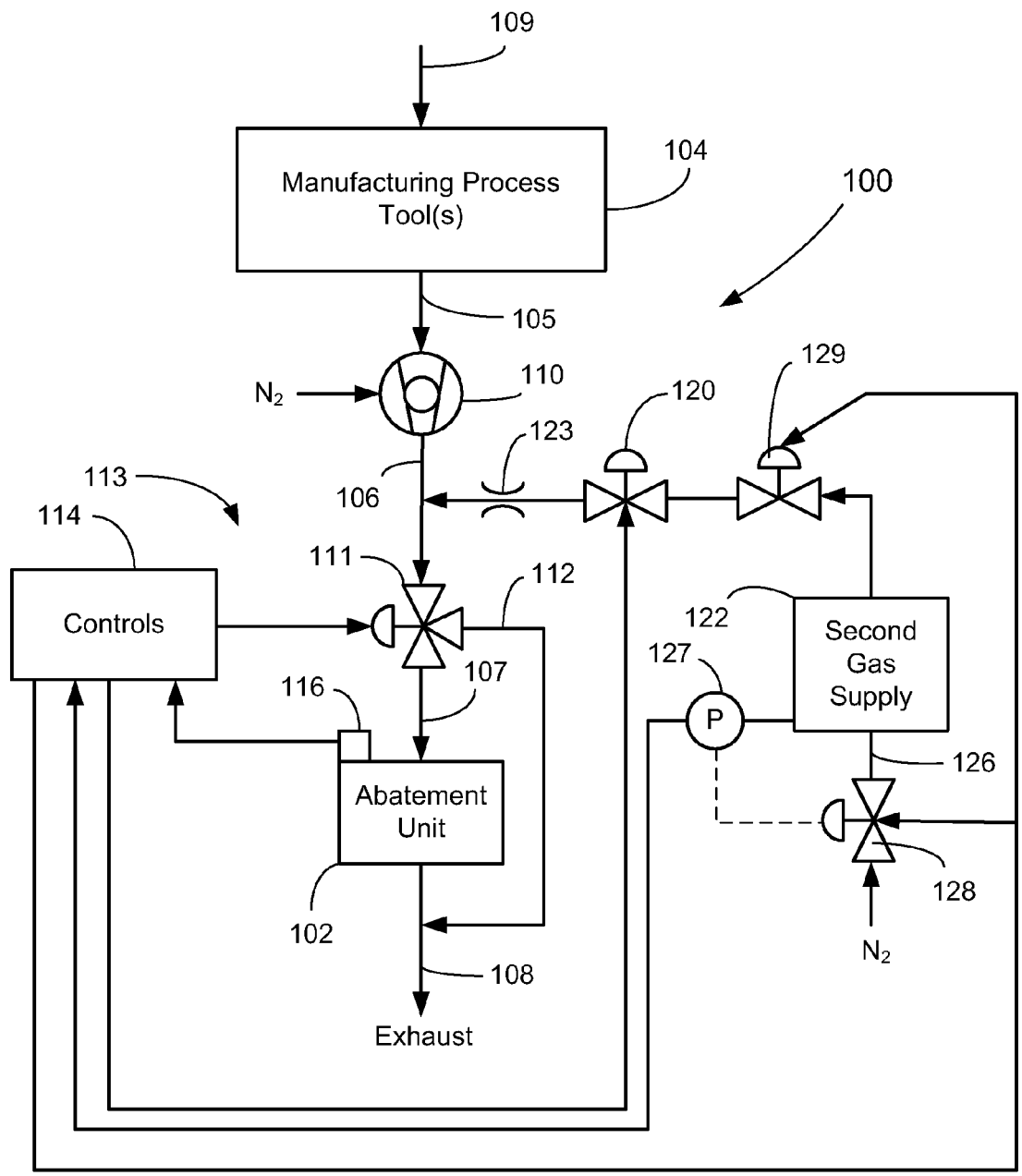
FIG. 1 is a schematic depiction of a system for treating flammable effluent gases of the present invention.

Electronic device manufacturing processes use a variety of chemical reagents and some fraction of these reagents may pass through process tools unused. These unused reagents, if they are simply routed directly through a facility exhaust system, may be undesirable for the environment, and/or pose a fire and/or explosion risk. In addition, electronic device manufacturing processes may create byproducts which may be similarly undesirable and may pose similar risks. For ease of reference, undesirable, toxic, flammable, pyrophoric and/or explosive, unused-reagents and byproducts exhausted from such processes may be referred to herein as "effluent gases" or merely "effluent."

To avoid possible harm to the environment, and/or possible safety risks, the electronic device manufacturing industry has generally embraced the abatement of such effluent gases. Abatement of undesirable effluent gases may take many forms, but ultimately abatement may transform undesirable effluent gases into non- or less noxious materials and/or gases. One method of abating undesirable effluent gases is to burn or combust the effluent gases in an abatement unit thereby converting the gases to less toxic forms, such as, for example, $CO_2$ and water vapor and possibly particulate matter.

In processes for the manufacture of solar panels, for example, large volumes of unused hydrogen and silane reagents, which are flammable and pyrophoric, respectively, may be exhausted from the manufacturing process chamber (e.g., a CVD deposition chamber). It may be desirable to abate these generally large volumes of such flammable and/or explosive gases. Other flammable gases that may be effluent gases from electronic device manufacturing processes may include germane ($GeH_4$), phosphine ($H_3P$), arsine ($H_3As$), etc. For ease of understanding, any effluent gas which is either flammable, pyrophoric, and/or explosive shall be generically referred to herein as being a "flammable gas." During abatement of these flammable gases, if the abatement unit processing these flammable effluent gases were to malfunction completely, or simply operate improperly or inefficiently, it may provide an operating condition which may be unsafe, e.g., a flammable gas or mixture of gases may pass unabated from the abatement unit. For example, a pilot or ignition mechanism malfunction may result in such a condition.

It is thus desirable to operate the abatement unit in such a way as to reduce or avoid the possibility of a flammable gas or mixture of gases passing unabated from the abatement unit. In some embodiments of the present invention, an operating parameter of an abatement unit may be monitored. Monitored items may include, for example, a status of a pilot or ignition mechanism, a status of a burner flame in the abatement unit via a radiation or temperature sensor, a flow rate of the effluent input, a fuel leak (via a fuel leak sensor), a recirculation or fresh water flow, a CPU fault, a liquid detected via a secondary containment sensor, a flow of auxiliary fuels (if any), a flammability of an exhaust gas from the abatement unit via an intrinsically safe flammable gas sensor, inlet pressure, exhaust pressure, and/or a chemical composition of effluent which exits the abatement unit.

In accordance with embodiments of the invention, the effluent flow may at times be diverted from the abatement unit. When a monitored parameter falls outside of a predefined bound (e.g., a threshold value is surpassed, either by exceeding or falling beneath the value) then the flammable effluent gas may be diverted to bypass the abatement unit. The diversion of effluent to bypass an abatement unit is deemed herein to be a "bypass event." Once diverted in a bypass event, the flammable effluent gas may be mixed with a second gas (e.g., an inert gas) thereby diluting the effluent gas. The second gas may be an inert gas, such as nitrogen, argon, helium, or any gas that will prevent combustion of the effluent or the formation of toxic by products.

A "lower flammability limit" of a gas (e.g., an effluent gas mixture) may be defined as a concentration of the gas in air below which a gas/air mixture will not support combustion, e.g., below which a gas/air mixture will not be flammable. Thus, in some embodiments, a sufficient amount of the second gas may be mixed into the effluent gas during a bypass event such that a concentration of the diluted effluent gas may be below the lower flammability limit of the gas. In some embodiments, the concentration of a mixture of flammable and/or pyrophoric gases may be diluted to an extent such that the concentration of each constituent gas may be below its lower flammability limit. For example methane or hydrogen may typically be diluted to below one quarter of their respective lower flammability limits. When $SiH_4$, a pyrophoric gas, is one of the effluent gases, the second gas may be provided in a volume sufficient to dilute $SiH_4$ to below $SiH_4$'s pyrophoric concentration of 1.6% in air. In this manner, safe exhaust of the effluent gas with a reduced or a zero risk of flame or explosion may be accomplished. Generally, the diluted gas may be sent to a house scrubber or point of use ("POU") scrubber.

In bypass events, the abatement unit may be shut down immediately (e.g., during critical events) and therefore the bypass valve may be actuated immediately. Such bypass events may include sensing a fuel leak, inadequate recirculation fluid flow or overload, a detection of a liquid in a containment, or a CPU failure, for example. In other events (e.g., delayed shutdown events), the actuation of the bypass valve may not be required. In such delayed shutdown events, the shutdown of the abatement system is delayed for a predefined time after the shutdown of the manufacturing process tool. In delayed shutdown events, because such events are not critical events which may result in an immediate undesirable condition being present, the delay may allow for a purge clearing of effluent gas from various system components, such as vacuum pump(s) and any conduits located between the pump (s) and the abatement unit before shutting down the abatement unit. In this manner, abatement of the effluent gas may be continued for a short period of time as the system components are being purged. In such a delayed bypass event, the purge gas may push a plug of effluent gas through the abatement unit and thus may desirably allow for the abatement of the gases remaining in the process conduits and pump(s).

These and other embodiments of the system and method are described below with reference to FIGS. 1-3.

Figure 2:
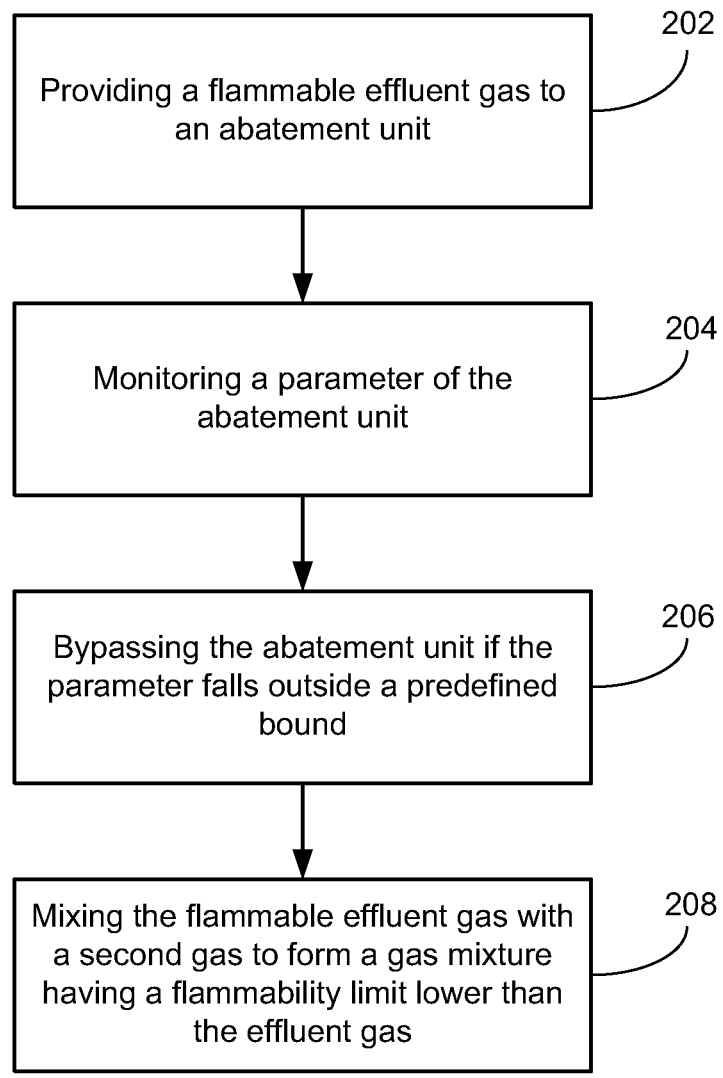
FIG. 2 is a flowchart illustrating a method of the present invention.

FIG. 1 is a schematic diagram of an exemplary abatement system 100 of the present invention. The abatement system 100 may include an abatement unit 102 which may be adapted to abate effluent gas which has been exhausted from one or more chambers of one or more manufacturing process tools 104. Effluent gas may flow from the process tool 104 through one or more exhaust conduits 105, 106, and 107 to the abatement unit 102, for example. Abatement unit 102 may be adapted to abate flammable effluent gas or mixture of gases via combustion and/or decomposition, for example. Suitable abatement units are described in US patent application publication number 2006/0104879 filed Nov. 12, 2004, and entitled "Reactor Design To Reduce Particulate Deposition During Process Abatement," and U.S. Pat. No. 7,138,096 entitled "Method For Decomposition Of Gaseous Pollutants," which are incorporated by reference above. The abated effluent may then be exhausted from abatement unit 102 through exhaust outlet 108, for example, where it may pass to the atmosphere. Optionally, the exhaust may flow to additional abatement devices (not shown), such as a particle removing apparatus (e.g., a packed bed), a POU scrubber, or house scrubber.

The present invention is operative with any abatement unit 102 that is adapted to process the effluent gas. The particular type of abatement unit is not itself of consequence to the invention, and any suitable reactor which may abate the effluent gas may be employed. The abatement unit may be, for example, a fuel burning thermal abatement unit such as a Marathon Abatement System manufactured by Applied Materials, Inc. of Santa Clara, Calif. Alternatively, the abatement unit may be electrically heated, or heated by any other suitable method. In some cases the abatement unit may need to be fueled with an auxiliary fuel source (e.g., natural gas). In other embodiments, the abatement unit may only need a minimal amount of auxiliary fuel in order to abate the effluent, such as when the effluent gas is itself flammable (e.g., $H_2$ or silane) and thus itself comprises the fuel.

In more detail, the manufacturing process tool 104 may be any tool or system that includes a process chamber (not shown) for producing electronic devices, such as LSIs (Large Scale Integrated Circuits), LCDs (Liquid Crystal Displays), solar cells, or subcomponents thereof, or the like, for example. As described above, the tool 104 may include process input gases (designated by arrow 109) wherein some fraction of which may be consumed and some fraction may simply pass through the process chamber (e.g., silane and/or H2). The tool 104 may further produce effluent gases as a byproduct of the process occurring within the chamber. Together, these effluent gases (those passing through and those created) may pass to the abatement unit 102 for abatement. Exemplary processes taking place within the process chamber of the process tool 104 may include deposition, etching, cleaning, seasoning, or any other suitable process.

For example, in solar cell manufacturing processes, the process chamber of the process tool 104 may produce a thin film of amorphous or crystalline silica on a substrate by the use of a silane gas ($SiH_4$) and hydrogen gas ($H_2$) as the input process gases at 109. Upon decomposition by a suitable process (e.g., PECVD or Cat-CVD), a silica film may be formed on the substrate within the chamber. However, because of a relatively low conversion rate, the exhaust (waste or effluent gas) from the process tool 104 may still contain relatively large quantities of hydrogen and/or silane which may be desirable to abate.

According to some embodiments, a pump 110 may be included, such as a vacuum pump, to maintain flow of the effluent gas and so that the process chamber of the tool 104 may be provided with a suitable vacuum level. Only one pump is depicted, but it should be recognized that multiple pumps, for example, staged vacuum pumps, may be used. Further, in operation, the pumps may include some inert gas (e.g., $N_2$) as a purge gas, for example. In some embodiments of the invention, a bypass valve 111 may be coupled to the conduit 106 which may be attached to and receive the effluent flow from the pump 110. The bypass valve 111 may be of any practical construction, such as a stainless steel or a high nickel alloy with sealing surfaces. The valve design may be a ball, gate, diaphragm, or any suitable valve. For example, suitable pneumatically operated stainless steel 1 inch internal diameter bypass ball valves are available from SVF Flow Controls Inc. The bypass valve 111 may be operative between a flow through configuration, where the effluent may be flowed through conduit 107 into the abatement unit 102, and a bypass configuration which may divert the effluent gas flow from the abatement unit 102 at times during system operation. For example, the effluent flow may be diverted to a bypass conduit 112 when a control system 113, including controller 114 and one or more sensors 116, determines that a parameter sensed by one or more of the sensors 116 falls outside of a predefined bound for the abatement unit 102. The predefined bound may be a measured condition or state in which, if the abatement unit 102 were allowed to continue beyond a predefined time in that condition or state, the abatement system 100 may be impacted to the point where an undesirable or unsafe condition may arise (e.g., a condition suitable or favorable for an explosion or fire). In such critical bypass events, the predefined time may be short (e.g., on the order of several seconds or less, such as, about 30, 20, 10, 5, 4, 3, 2, or 1 second (s), or less). However, in delayed shutdown events, the abatement unit may continue to operate for up to about 30, 20, or 15 seconds after the shutdown of the process tool 104 so as to clear/purge system components such as pumps and conduits and then bypass may be needed. The amount of delay time for delayed shutdown events depends on the volume of the system between the tool and the abatement unit. Thus, depending upon the volume of the system between the process tool and the abatement unit, the abatement unit may continue to operate for up to about 30, 20, or about 10 seconds after the shutdown of the process tool 104.

Accordingly, one or more sensors 116 may be operatively coupled to the abatement unit 102 and employed to determine one or more operating parameters (e.g., a condition) of the abatement unit 102. The monitored operating parameters may include any of the parameters listed above.

The one or more sensors 116 may be communicatively connected with controller 114. A flame and/or a flammable gas sensor may be used, such as described in US patent application publication 2006/0104878 filed Nov. 18, 2004, and entitled "Safety, Monitoring And Control Features For Thermal Abatement Reactor." The controller 114 may continuously monitor one or more operating parameters of the abatement unit 102 via input(s) from the one or more sensor (s) 116. Controller 114 may be a central processing unit or other control system such as a microprocessor and memory wherein a program may be stored and executed to generate an output command to the bypass valve 111. In particular, in response to a sensed input or inputs, the controls 114 may generate an output command (e.g., an electrical signal) which may control the mode of the bypass valve 111 between the flow through mode and the bypass mode.

For example, as described above, the bypass valve 111 may include a flow through mode, where if the abatement unit 102 is deemed by the control system 113 to be operating within acceptable bounds of the operating parameter or parameters sensed, then the effluent gas may be passed through the bypass valve 110 and to the abatement unit 102 for suitable abatement. Contrarily, in the bypass mode, the bypass valve 111 may be set such that effluent gas flow bypasses the abatement unit 102 and may be directed to, and may pass through, the bypass conduit 112. The diversion to the bypass mode may occur, for example, when a sensed parameter exceeds a predetermined bound. In operation, when a bypass event is determined, the supply of process gas 109 to the tool 104 may be immediately shut off and the tool exhaust valves (not shown) located at the exit of the process chambers (not shown) of the tool 104 may be closed. The predetermined bound may be set based on experience with the abatement unit 102, and may be set conservatively such that an unsafe condition may never occur. In cases where a critical bypass event is sensed, the bypass mode may be immediately commanded. If a delayed shutdown event is sensed, then the flow to the tool is shutdown, but the system may continue to abate the effluent contained in the conduits and system components located between the tool and the abatement unit, after which the abatement unit may be shut down.

In bypass events, generally simultaneously with the output command from the controller 114 to the bypass valve 111 to divert the effluent gas, a command to a second valve 120 may open the second valve 120 and mix a second gas passing through conduit 121 from a second gas supply 122 into the conduit 106 containing the effluent gas. Accordingly, the mixed gases pass through conduit 112. The second gas may be an inert gas such as nitrogen, helium, argon, or any other non-volatile, non-oxidizing gas. By mixing in the second gas from the second gas supply 122, a diluted gaseous mixture may be formed having a lower flammability limit which is greater than the lower flammability limit of the undiluted effluent gas. This gaseous mixture may then be exhausted to the atmosphere through conduit 112 or an appropriate in-house or POU scrubber through exhaust conduit 108.

The flammable effluent gas may include one or more constituent gases. The second gas may be mixed with the flammable effluent gas in a proportion such that a concentration of a constituent gas of the flammable effluent gas may be reduced below the lower flammability limit of the constituent gas. The second gas may also be mixed with the flammable effluent gas in a proportion such that each of the one or more constituent gases of the flammable effluent gas may be reduced below the particular constituent gas' lower flammability limit. The resulting diluted effluent gas may be non-flammable. The flammable constituent gases of the effluent gas may be about 2% or less, or even about 1% or less, of the total volume of diluted effluent gas. The volumetric flow rate of the second gas into the conduits 106 and through conduit 112 should be relatively fast, such as 0.5 m³/s or more, for example. This may be accomplished by the use of a second gas supply 122 which may be appropriately pressurized and a throttling valve 123, for example. The second gas supply 122 may be contained in any suitable pressure vessel and may be maintained in the vessel at a pressure of between about 75 psi and about 120 psi, and, in some embodiments, about 90 psi, for example. As the supply of the second gas (e.g., $N_2$) is diminished (through use, for example) the second gas supply 122 may be refilled from a secondary supply of the second gas (designated $N_2$ in FIG. 1) by supply conduit 126 to maintain the second source at a suitable static pressure. A suitable pressure gauge 127 may be employed to monitor the pressure and close valve 129 and open valve 128 when the pressure falls below a predetermined level. The valves 128 and the gauge 127 may interface with controller 114 to manage the refill at appropriate times and to monitor for leaks, etc. Other configurations of valves may be employed to provide the bypass function.

A flowchart depicting a method of treating a flammable effluent gas according to the present invention is shown and described with reference to FIG. 2. The method begins in step 202 wherein a flammable effluent gas is provided from an electronic device manufacturing process tool. The effluent gas is normally provided to an abatement unit adapted to abate effluent gas. The method includes step 204 of monitoring a parameter of the abatement unit (e.g., presence of a flame, presence of a flammable gas, or any of the other parameters listed above). The method also includes step 206 wherein the effluent gas is bypassed if the monitored parameter of the unit falls outside a predefined bound. The method ends in step 208 wherein a second gas is mixed into the effluent gas to dilute the same. This mixing step may provide a gas mixture which is less flammable than the effluent gas or nonflammable. The mixture may then be exhausted to the atmosphere, stored in a supplemental vessel, and/or subjected to further abatement.

Figure 3:
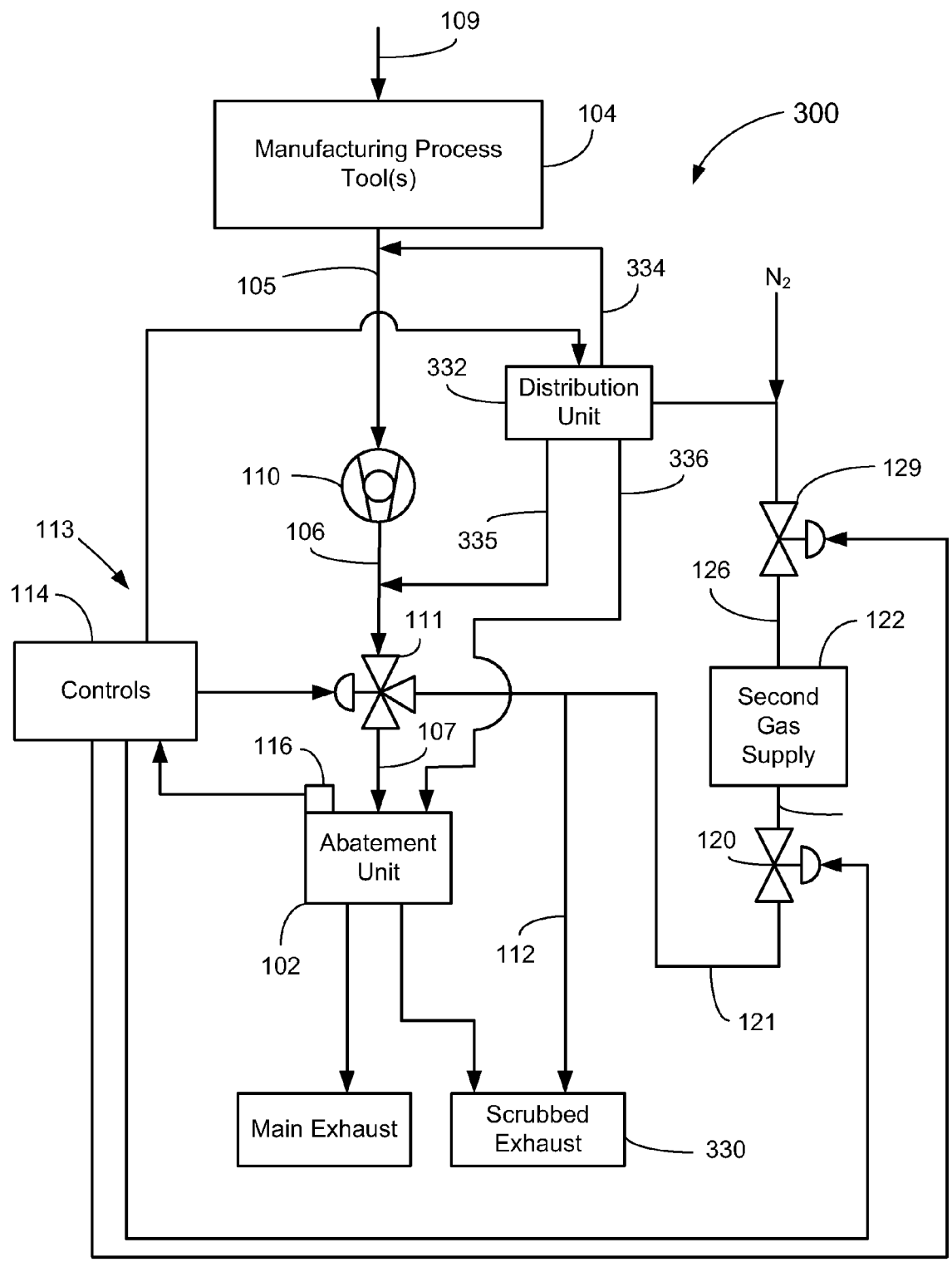
FIG. 3 is a schematic depiction of another embodiment of a system for treating flammable effluent gases of the present invention.

A second embodiment of an effluent gas treatment system 300 is depicted in FIG. 3. As in the previous embodiment, the effluent gas (e.g., $H_2$ and silane) may be exhausted from one or more process chambers of one or more manufacturing process tools 104 into an exhaust conduit 105. Vacuum pump 110 (which may comprise a plurality of staged vacuum pumps) may draw the effluent gas into a conduit 106 and, under normal operating conditions, the effluent may pass through a bypass valve 111 into conduit 107 and into an abatement unit 102 (such as any of the abatement units described above). If a critical bypass event is determined by the control system 113 comprising controller 114 and one or more sensors 116, then the bypass valve 111 may be actuated to the bypass position and the effluent may be diverted to a bypass conduit 112. Substantially coincident with the diversion, valve 120 may be actuated and a supply of a second gas from a second gas supply 122 may travel in conduit 121 and be mixed with the effluent gas. The mixture of the second gas and the effluent gas may travel in bypass conduit 112 to a scrubbed exhaust 330 (e.g., a conventional house or POU scrubber), for example. As in the previous embodiment, the second gas supply 122 may be replenished from inert gas supply, designated $N_2$, via actuating valve 128. Of course, as the bypass event is determined, the supply of process gas in 109 to the tool 104 may be immediately shut off and the exhaust valves (not shown) of the process tool 104 may be closed.

The system 300 may further include a distribution unit 332 (e.g., a panel of mass flow-controlled valves) which may input a dilution gas (e.g., inert gas such as $N_2$) to the effluent treatment system 300 at various input points. For example, in one embodiment, the volumetric flow rate of the second gas may be controlled above the pump 110 via inputting a controlled amount of the second gas through conduit 334 into exhaust conduit 105. During normal operation, the flammable effluent gas may flow from a manufacturing process tool 104 through a pump 110 and exhaust conduits 105, 106, 107 to an abatement unit 102. During this normal operation, the pump 110 may be purged with a purge gas (e.g., $N_2$) having volumetric flow rate of a first magnitude to ensure safe pump operation.

According to an additional method embodiment, when a delayed shutdown event is sensed (such as any of the sensed parameters listed above being outside of a predetermined bound), then substantially coincident with, or a brief time after shutting down the flow of the flammable effluent gas from the manufacturing process tool 104, a volumetric flow rate of the purge gas may be reduced to a second, non-zero, volumetric flow rate for a period of time. This may allow for the purge of any flammable effluent gas remaining in conduits 105, 106, and 107 and pump 110 following shut down of the flow of flammable effluent gas from the manufacturing process tool 104 to take place. During this time in the delayed shutdown, effluent gas may be pushed along to the abatement unit 102 and the abatement unit may continue to operate until the conduits are substantially purged. Of course, the bypass valve 111 may be actuated at any point prior to full purge and divert the remaining effluent to the bypass conduit 112 and scrubbed exhaust 330. This may result in a partial purge of the components. The delay time required for a full purge may be dependent on the flow rate of the purge gas used and the volume of the pump and conduit components between the tool 104 and the abatement unit 102. The nonzero volumetric flow rate of the second magnitude may be less than 20%, or even less than 10% of the volumetric flow rate of the first magnitude. Because of the lowered amount of $H_2$ in the exhaust conduits following shutdown, a lower volume of purge gas may be needed in order to maintain a safe (non-flammable) condition of the pump 110 and conduits 105, 106, and 107. In particular, it may be desirable to maintain the maximum concentration of $H_2$ in the purge gas below 1% (equivalent to about one-quarter the lower flammability limit of $H_2$). After the pump is purged, the flow rate may be further increased to accelerate the purge process.

According to yet another embodiment of the invention, a method of treating a flammable effluent gas is provided wherein a delay may be provided between shutdown of the process tool 104 and the shutdown of the abatement unit 102 (a "delayed shutdown"). After a shutdown has been commanded, either because a monitored parameter has been determined to fall outside a predefined bound, or simply because of a desire for a manual shutdown (e.g., for maintenance), the flow of the flammable effluent gas from a manufacturing process tool 104 may be shut down. This may involve shutting off the flow of the process gasses and shutting off the exhaust valve (not shown) below the process chamber (also not shown).

Following the shutdown of the process tool 104, a shutdown of the abatement unit 102 may be delayed for a period of time to purge the flammable effluent gases from at least some of the exhaust components (e.g. the pump 110 and/or at least some of the conduits 105, 106, and 107) between the manufacturing process tool 104 and the abatement unit 102. The delay in shutdown may account for the time it takes to purge the effluent gases from the exhaust components. It should be noted that this delayed shutdown method may be suitable for noncritical events where the abatement unit, even though it may have a parameter falling outside of a predefined bound, will still operate effectively to abate the effluent and no serious risk of explosion may exist. During the delay, the abatement unit 102 may continue to operate normally and abate the effluent. As the purge gas introduced following shutdown of tool 104 reaches the abatement unit 102, the abatement unit may then also be shut down. Of course, at any point during the delay, the bypass valve 111 may be commanded by controller 114 to actuate to the bypass mode and the gas may be diverted to the bypass conduit 112. Additionally, conduits 335 and 336 may be provided whereby the distribution unit 332 may input purge gas at any other location such as below (downstream of) the pump 110 in conduit 335, or to the abatement unit 102 in conduit 336. In the case of a delayed shutdown, the amount of purge gas added may be sufficient to ensure that no flammable mixture opportunities exist in the exhaust components. This may include ensuring that the amount of $H_2$ present may be such that the maximum $H_2$ concentration is not exceeded. Likewise, when silane is included in the effluent gas, the amount of purge gas added may be such that the maximum silane concentration is not exceeded (e.g., about one-quarter a lower explosive limit or LEL).

The foregoing description discloses only exemplary embodiments of the invention. Modifications of the above disclosed apparatus and methods which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. A method of treating a flammable effluent gas from an electronic device manufacturing process, comprising the steps of:
   providing a first configuration and a second configuration of conduits for mixing a second gas with the flammable effluent gas, the second configuration comprising a distribution unit configured to receive the second gas from at least an external source and configured to input the second gas at one or more input points including directly to an abatement unit which is adapted to abate the flammable effluent gas, the first configuration excluding the distribution unit and including a stored gas supply comprising the second gas, the first configuration configured to input the second gas from the stored gas supply into a bypass conduit bypassing the abatement unit;
   providing the flammable effluent gas from the manufacturing process to the abatement unit;
   monitoring a parameter of the abatement unit;
   diverting the flammable effluent gas by actuating a bypass valve to bypass the abatement unit if the parameter of the abatement unit falls outside a predefined bound; and
   mixing, substantially coincident with actuating the bypass valve, the diverted flammable effluent gas with the second gas in the bypass conduit downstream of the bypass valve in the first configuration to form a gas mixture having a lower flammability than the flammable effluent gas, wherein a concentration of flammable effluent gas in the gas mixture is below a lower flammability limit of the flammable effluent gas.

2. The method of claim 1 further comprising a step of exhausting the gas mixture to the atmosphere.

3. The method of claim 1 wherein the second gas comprises an inert gas.

4. The method of claim 3 wherein the inert gas comprises nitrogen.

5. The method of claim 1 wherein the flammable effluent gas comprises hydrogen.

6. The method of claim 5 wherein the flammable effluent gas comprises between about 0.1% and about 20% hydrogen.

7. The method of claim 1 wherein the flammable effluent gas comprises silane.

8. The method of claim 7 wherein the flammable effluent gas comprises between about 0.1% and about 20% silane.

9. The method of claim 1 wherein the flammable effluent gas comprises hydrogen and silane.

10. The method of claim 9 wherein the flammable effluent gas comprises between about 0.1% and about 20% hydrogen and between about 0.1% and about 20% silane.

11. The method of claim 1 wherein the step of monitoring comprises sensing a presence of a flame in the abatement unit.

12. The method of claim 1 wherein the step of monitoring comprises sensing a presence of a flammable gas within the abatement unit.

13. A method of treating a flammable effluent gas from an electronic device manufacturing process, comprising the steps of:

providing a first configuration and a second configuration of conduits for mixing a nitrogen gas with the flammable effluent gas, the second configuration comprising a distribution unit configured to receive the nitrogen gas from at least an external source and configured to input the nitrogen gas at one or more input points including directly to an abatement unit, the first configuration excluding the distribution unit and including a stored gas supply comprising the nitrogen gas, the first configuration configured to input the nitrogen gas from the stored gas supply into a bypass conduit bypassing the abatement unit;

flowing the flammable effluent gas from a process chamber of the electronic device manufacturing process to the abatement unit wherein the flammable effluent gas is comprised of silane and hydrogen;

monitoring a parameter of the abatement unit;

diverting the flammable effluent gas by actuating a bypass valve to bypass the abatement unit if the parameter of the abatement unit falls outside a predefined bound; and mixing, substantially coincident with actuating the bypass valve, the diverted flammable effluent gas with the nitrogen gas in the bypass conduit downstream of the bypass valve in the first configuration to form a gas mixture having a lower flammability than the flammable effluent gas, wherein a concentration of flammable effluent gas in the gas mixture is below a lower flammability limit of the flammable effluent gas.

14. A system for treating a flammable effluent gas of an electronic device manufacturing process chamber, comprising:

at least one exhaust conduit adapted to carry the flammable effluent gas to an abatement unit;

a bypass conduit adapted to carry one or more gases and to bypass the abatement unit;

a monitoring system coupled to the abatement unit and adapted to sense a parameter of the abatement unit;

a bypass valve coupled to the at least one exhaust conduit and to the bypass conduit and operatively responsive to the monitoring system, wherein the bypass valve has a bypass mode and a flow through mode, and wherein a flow of the flammable effluent gas is diverted from the abatement unit to the bypass conduit in the bypass mode, and a flow of the flammable effluent gas is directed to the abatement unit via a flow through the at least one exhaust conduit in the flow through mode;

a stored gas supply connected to mix a second gas with the flammable effluent gas in the bypass conduit downstream of the bypass valve substantially coincident with the bypass valve switching to the bypass mode to form a gas mixture when the bypass valve is operating in the bypass mode such that a concentration of flammable effluent gas in the gas mixture is below a lower flammability limit of the flammable effluent gas;

a distribution unit coupled to an external source of the second gas, to the stored gas supply, and to the at least one exhaust conduit and configured to input the second gas at one or more input points along the at least one exhaust conduit upstream of the bypass valve and directly to the abatement unit; and a second gas conduit coupled to the bypass conduit and to the stored gas supply, wherein a flow of the second gas from the stored gas supply is directed through the second gas conduit bypassing the distribution unit in the bypass mode to mix with the flammable effluent gas in the bypass conduit.

15. The system of claim 14 wherein the monitoring system comprises a flame sensor.

16. The system of claim 14 wherein the monitoring system comprises a flammable gas sensor.

* * * * *